(12) United States Patent
Lindquist et al.

(10) Patent No.: US 6,657,119 B2
(45) Date of Patent: Dec. 2, 2003

(54) ELECTRIC CONNECTION OF ELECTROCHEMICAL AND PHOTOELECTROCHEMICAL CELLS

(75) Inventors: Sten-Eric Lindquist, Uppsala (SE); Anders Hagfeldt, Björklinge (SE); Henrik Lindstrom, Uppsala (SE); Sven Södergren, Uppsala (SE)

(73) Assignee: Forskarpatent I Uppsala AB, Uppsala (SE)

( * ) Notice: Subject to any disclaimer, the term of this patent is extended or adjusted under 35 U.S.C. 154(b) by 47 days.

(21) Appl. No.: 10/024,715

(22) Filed: Dec. 14, 2001

(65) Prior Publication Data

US 2002/0148721 A1 Oct. 17, 2002

Related U.S. Application Data

(63) Continuation-in-part of application No. 09/889,333, filed as application No. PCT/SE00/00003 on Jan. 3, 2000.

(30) Foreign Application Priority Data

Jan. 15, 1999 (SE) ................................ 9900103

(51) Int. Cl.$^7$ ........................ H01L 31/18; H01L 31/048
(52) U.S. Cl. ................. 136/251; 136/252; 136/263; 136/256; 429/111; 429/163; 429/185; 429/177; 204/242; 438/64; 438/85; 427/74; 427/58
(58) Field of Search .................. 136/252, 263, 136/251, 256; 429/111, 163, 185, 177; 204/242; 438/64, 85; 427/74, 58

(56) References Cited

U.S. PATENT DOCUMENTS 3,775,239 A * 11/1973 Snow ........................ 383/107
3,899,283 A * 8/1975 Wallis ........................ 425/461
4,117,210 A * 9/1978 Deb et al. .................... 429/111
4,260,429 A 4/1981 Moyer ........................ 136/256
5,084,107 A 1/1992 Deguchi et al. ............. 136/256
5,151,373 A 9/1992 Deguchi et al. ......... 156/274.8
5,525,440 A 6/1996 Kay et al. .................... 429/111
6,051,778 A * 4/2000 Ichinose et al. ............. 136/256
6,462,266 B1 * 10/2002 Kurth ........................ 136/251
6,469,243 B2 * 10/2002 Yamanaka et al. .......... 136/263
2002/0148721 A1 * 10/2002 Lindquist et al. ........... 204/242

FOREIGN PATENT DOCUMENTS

EP 0807980 A2 11/1997

OTHER PUBLICATIONS

A. Kay and M. Grätzel, "Low cost photovoltaic modules based on dye sensitized nanocrystalline titanium dioxide and carbon powder," Solar Energy Materials and Solar Cells, vol. 44, pp. 99–117 (1996).

* cited by examiner

*Primary Examiner*—Alan Diamond
(74) *Attorney, Agent, or Firm*—Young & Thompson

(57) ABSTRACT

An electrolytic cell assembly, e.g. for use in solar panels, is formed by placing coated metal wires (7,9) between the conducting layers (3,6) of two conducting glasses (1,4), respectively. A pressure force (F) is applied to press the metal wires between the conducting layers and to break the coating of the wires, thereby bringing the metal wires in electrical contact with the conducting layers. The coating protects the wires from harmful contact with an electrolyte inside the cell.

23 Claims, 5 Drawing Sheets

ELECTRIC CONNECTION OF ELECTROCHEMICAL AND PHOTOELECTROCHEMICAL CELLS

CROSS REFERENCE TO RELATED APPLICATION

This patent application is a continuation-in-part of U.S. patent application Ser. No. 09/889,333, filed on Nov. 7, 2001, as the 35 USC 371 national stage of International Application PCT/SE00/00003 filed on Jan. 3, 2000 which designated the United States of America.

TECHNICAL FIELD

The present invention relates to a method for forming electrochemical cells, including forming electrical connections within such cells.

TECHNICAL BACKGROUND

Electrode materials formed by a transparent glass or plastic material substrate coated with a thin transparent layer of conducting material are generally referred to as transparent conductors, conducting glasses or conducting plastics. For reasons of convenience, the term "conducting glass" will be used throughout the present application to indicate both glass and plastic substrates being provided with a conducting layer. It should also be noted that the present invention is not limited to transparent conducting glass, but is useful also in cases wherein the substrate and/or the thin conducting layer is opaque.

Furthermore, for reasons of convenience the term "electrochemical cell" will be used throughout the present invention to designate "electrochemical and/or photoelectrochemical cell", such as solar cells, cells in liquid crystal displays and battery cells.

The conducting layer is typically a few tenths of a micrometer thick. It consists typically of fluorine or indium doped tin oxide (ITO) or aluminum doped zinc oxide. Today there exist materials that exhibit approximately 80% light transparency within the visible range. The resistivity of these materials is typically approximately 5 ohm/$cm^2$ or higher.

The electrical and optical properties of the conducting layer are inversely correlated to each other. Thus, in order to achieve a high conductivity a comparatively thick conducting layer has to be applied resulting in reduced light transparency. On the other hand, to achieve a good transparency a thin conducting layer should be applied resulting in reduced electrical conductivity.

Consequently, a compromise between transparency and electrical conductivity has to be accepted.

However, in certain applications, such as in solar cells, both high light transparency and high electrical conductivity are desired. Conventionally, this is achieved by the use of glass or plastic substrates having relatively high transparency. On these substrates numerous smaller separate solar cells are formed. Short circuit between separate solar cell units on the substrate is avoided by removing areas of the conducting layer between the cell segments. In order to avoid series resistance of the transparent conducting layers, current collectors are connected to each cell segment to conduct the current away from each individual cell.

The current collectors are formed from a material having high conductivity, such as metals or highly doped metal oxides, like those mentioned above.

To further minimize the internal resistive losses in a solar panel a high cell potential and low current is preferred. This is achieved by connecting in series a number of cells to a solar cell module so that the electrical potential from the entire solar cell module is increased.

In some electrochemical cells, such as the solar cells described in U.S. Pat. No. 5,525,440 to Kay et al., substances that act corrosively on the current collectors are present. In such cells the series connection devices must also withstand chemical deterioration. Generally, the current collectors should not corrode when the solar cells are stored in normal indoors or outdoors environment.

The methods used today to provide electrical connecting means in conducting layers of electrochemical cells include:
1) Deposition by evaporation. Using this method, the electrical connecting means are formed by depositing strings of highly conductive materials from vapor of, for example, metals or highly doped metal oxides. As the melting temperature of the evaporated material often is high, the depositing process has to be carried out at high temperature and vacuum conditions. The process equipment requires a lot of space. The method requires that a mask is placed in front of the substrate.
2) Sputtering. Also with the sputtering method the electrical connecting means are deposited on the substrate at a high temperature and in a vacuum. The process equipment requires a lot of space and high investment costs. Also the sputtering method requires that a mask is placed in front of the substrate.
(3) Screen printing, spraying etc. Solutions of small metal or conductive metal oxide particles are applied at a low temperature using conventional methods from the printing industry. The conductive particles are sintered together at high temperature to obtain good conductivity. An alternative is to use adhesives containing conductive particles such as silver conducting paint. Also with these methods it is required that a mask is placed in front of the substrate.
(4) Electroplating. The electrical connecting means can be applied to the conducting layer by electroplating. By immersing the substrate with the conducting layer in metal salt solutions, and then applying a negative potential on the conducting layer, metal is deposited directly on the conducting layer. Also with this method it is required that a mask is placed in front of the substrate.

Through U.S. Pat. No. 4,260,429 it is known to use metal wires as top electrodes by coating them with a solid polymer containing electrically conductive particles and then attach them to a semiconductor material by the application of heat and/or pressure. U.S. Pat. No. 4,260,429 teaches that the conductive particles are essential for the invention, since omitting them would result in a much reduced power output.

Through U.S. Pat. No. 5,084,107 a solar cell is known which includes a plated metal wire fixed to a light incident surface with an electrically conductive adhesive. U.S. Pat. No. 5,151,373 discloses a method for forming a solar cell similar to the solar cell of U.S. Pat. No. 5,084,107.

Through EP 0 807 980 A2 it is known to attach electrical wires, serving as current collectors, to a solar cell material in a solid state solar cell using an electrically conducting adhesive. The wires are attached to a supporting polymer film at the edge outside the cell using an adhesive, and a conducting bus bar is connected to the wires, for example using a conducting adhesive.

However, there still remains a need for a fast and cost effective method to produce electrochemical cells that provides electrical connection of conducting parts as well as chemical protection of the electrical connections.

SUMMARY OF THE INVENTION

In a first aspect, it is an object of the present invention to provide a novel method for forming electrochemical cells that is fast and provides electrical connection and chemical protection of the electrical connections in the same operative step.

This object is achieved by a method as defined in claim 1 of the appended claims.

The method of the invention provides advantages, as compared to previously known methods described above, such as no or reduced need for high temperature or vacuum environment, no need for masking and comparatively inexpensive process equipment. Furthermore, according to the invention a chemical protection of the wire, as well as a separating barrier between adjacent cells in a multi-cell assembly, is provided at the same time as the electrical connection is established.

In a second aspect, the object of the present invention is to provide an electrochemical cell assembly. This object is achieved by an assembly as defined in claim 7 of the appended claims.

BRIEF DESCRIPTION OF THE DRAWINGS

The present invention will now be described with reference to the attached drawings, wherein.

DETAILED DESCRIPTION OF PREFERRED EMBODIMENTS OF THE INVENTION

In addition to the definitions of the terms "conducting glass" and "electrochemical cell" above, it should also be understood that the terms "upper" and "lower" as used herein relates to directions perceived when studying the attached figures, and should not be understood as limiting in any sense. The invention could of course be practiced in any suitable direction.

Figure 1:
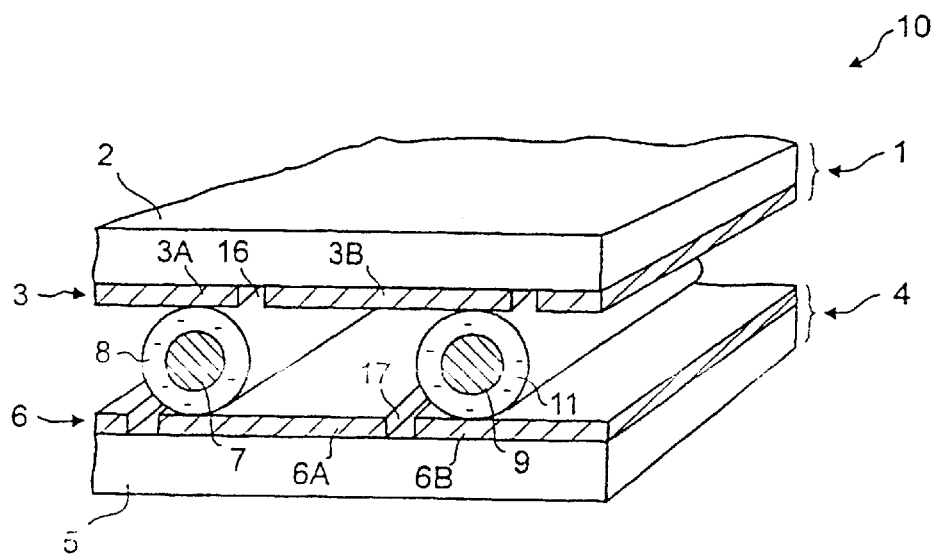
FIG. 1 is a perspective cutout view showing components of an electrochemical cell according to the invention in positions according to an initial step of the method of the invention.
Figure 2:
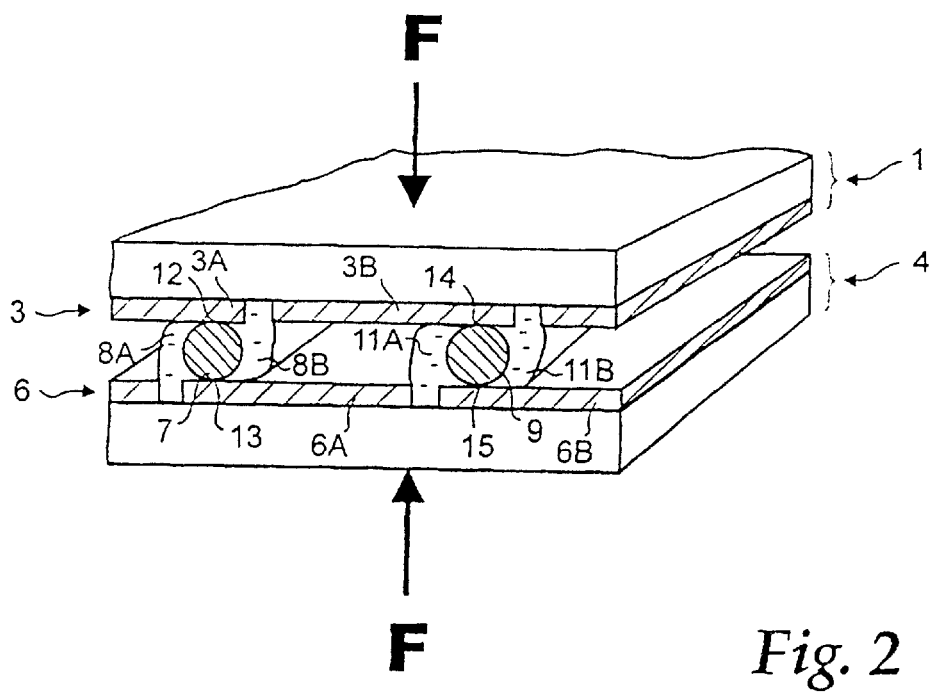
FIG. 2 is a perspective cutout view of a consecutive step according to the method of the invention, following the step in FIG. 1, wherein the conducting glasses are pressed together.

A first preferred embodiment of the invention is illustrated in FIGS. 1–5, wherein FIGS. 1 and 2 schematically show a part of an electrochemical cell assembly according to the invention. The assembly 10 is in FIG. 1 shown in a state prior to a compressing step, includes a first plate member 1 which is an upper conducting glass consisting of a substrate 2 at one side provided with a conducting layer 3, a second plate member 4 which is a lower conducting glass 4 consisting of a substrate 5 at one side provided with a conducting layer 6 and two metal wires 7, 9 each coated with an insulating material 8, 11. The coated metal wires 7, 9 are placed between the conducting layers 3 and 6.

The conducting layer 3 of the upper conducting glass is separated into two electrically disconnected electrode areas 3A, 3B by a gap 16. The gap 16 is formed by any conventional method, such as laser scribing or etching. Similarly, the conducting layer 6 of the lower conducting glass is separated by a gap 17 into two electrically disconnected electrode areas 6A, 6B. Each gap 16, 17 extends in parallel with the metal wires 7, 9.

The metal wire is formed from any suitable electrically conductive metal, such as copper, silver, tin etc., a metal alloy or multi-layer metals, such as silver-coated copper. A single as well as a stranded wire is useful to suit the application at hand.

Any suitable cross sectional shape of the metal wire could be used, although a circular cross section is preferred for economical reasons as well as for ease of handling. A twisted metal wire is useful in that it shows a higher tendency to penetrate the coating than does a non-twisted wire.

The material of the coating 8, 11 of the metal wires 7, 9 is selected to be easily deformed and broken in response to an applied pressure.

The coating of the metal wire is preferably made from fluoroplastics such as fluorinated ethylenepropylene (FEP), perfluoro alkoxy (PFA), ethylene tetrafluroethylene (ETFE), polytetrafluorethylene (PTFE) such as Teflon®. An even more preferred polymer material comprises ionomer resins such as Surlyn® obtainable from DuPont. The coating is applied in one or several layers. The wire could also be treated with adhesives, such as Torr Seal from Varian, or a suitable lacquer.

It should be noted that although the cross sectional shape of the coating preferably is circular, it could be of any suitable symmetric or asymmetric shape, such as oval.

It should also be noted that the wire could be coated with different layers on top of each other, each layer having different characteristics with respect to conductivity, adherence, electrical insulation and/or chemical protection etc. For example, an electrically conducting metal core wire of high mechanical strength could be coated with a conducting soft metal, a gluing layer, an electrically insulating layer, and finally coated with a chemically protecting layer.

In fact, the coating material could even be a viscous material, such as a melted plastic or an incompletely cured resin.

However, for reasons of simplicity, only the example of a conducting wire with a single insulating layer will be described in the following.

A first detailed, not limiting example of a first embodiment of the present invention shall now be described, with reference to FIGS. 1–5, wherein each conducting glass 1, 4 consists of a 10×10 cm square transparent soda lime glass substrate 2, 5 of 3 mm thickness.

Each conducting glass 1, 4 has on one side a conductive surface layer 3, 6 of fluorine doped tin oxide. The resistivity of the conducting layer is 8 Ohm/cm$^2$, and the transparency is 80% in the visible light range.

Figure 3:
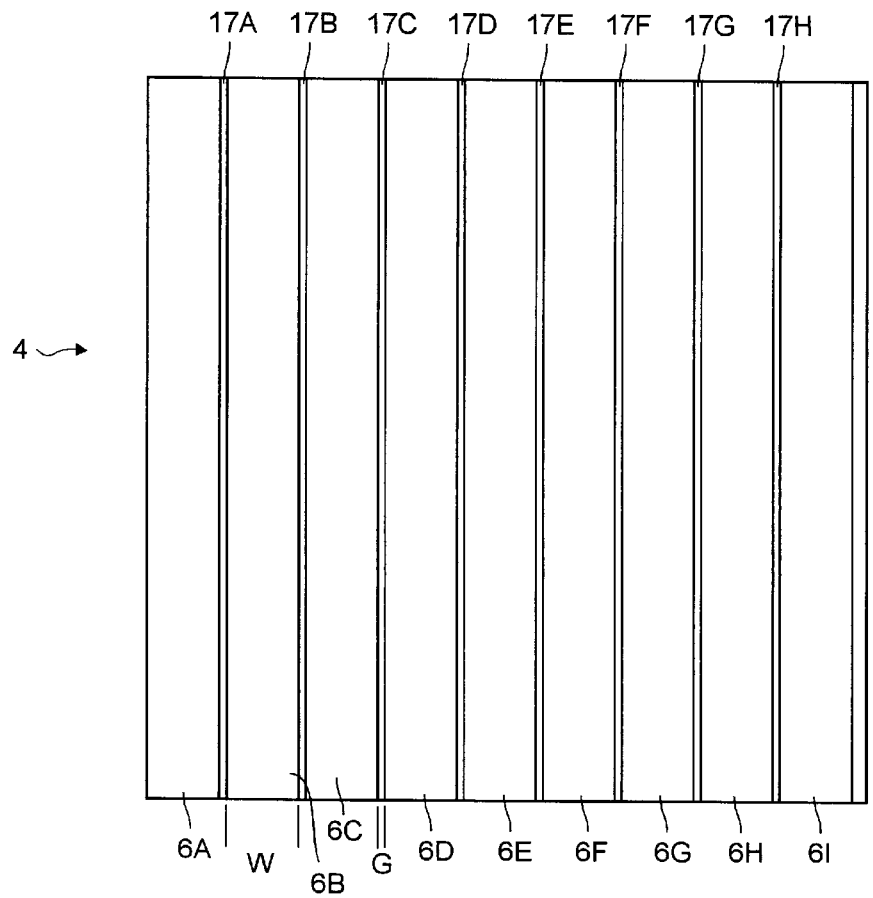
FIG. 3 is a top view of the lower conducting glass of FIG. 1.
Figure 4:
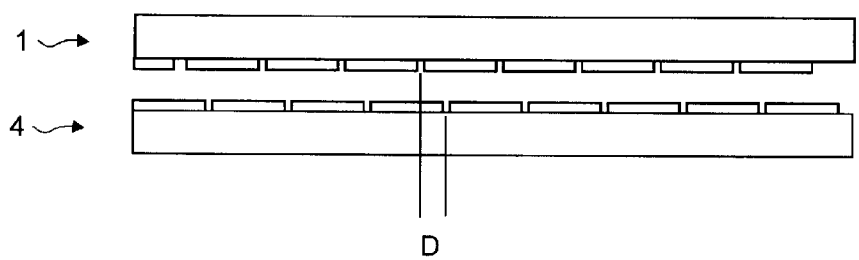
FIG. 4 is a side view of two opposing conducting glasses.

As is illustrated in FIG. 3, wherein a top view of the lower conducting glass 4 of FIG. 1 is shown as an example, electrode areas 6A–I each with a width W of 1 cm are separated by straight gaps 17A–H having a width G of 0,1 mm wide. As is seen in FIGS. 3 and 4, the gaps extend from one edge of the substrate to the other and through the thickness of the conducting layer to electrically disconnect the electrode areas. The gaps are formed by any suitable conventional method, such as laser scribing.

It should be noted that the positions of the gaps on one conducting glass typically are displaced with respect to the positions of the gaps of the other conducting glass. Therefore, when registering one conducting glass above the other with the conducting layers facing each other, as illustrated in FIG. 4, the gaps of the upper conducting layer are parallel with respect to the gaps of the lower conducting layer and are at the same time displaced a distance D in the transverse direction.

Figure 5:
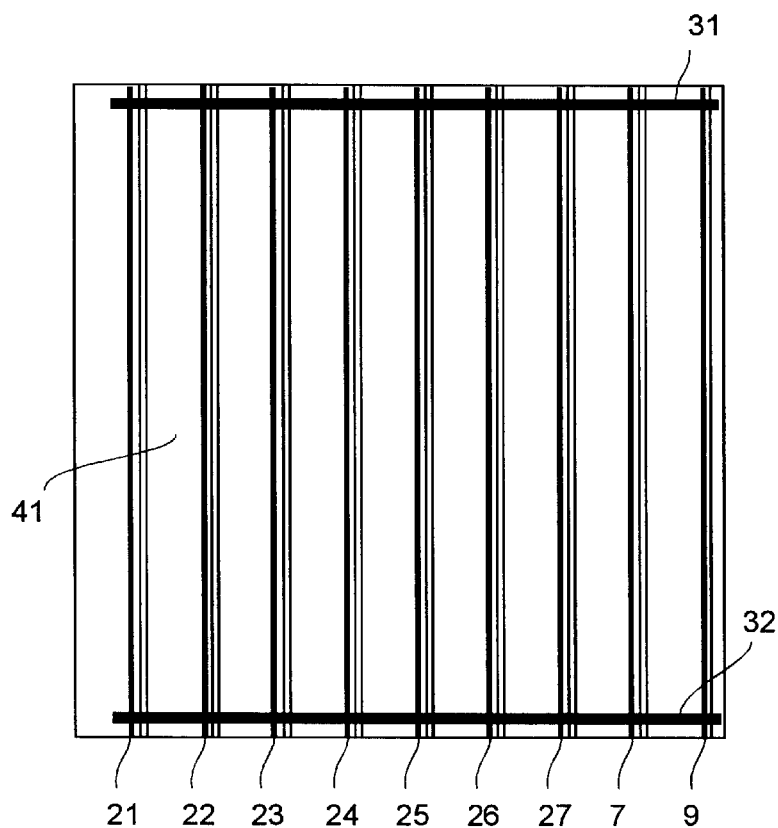
FIG. 5 is a top view of a solar cell assembly with the top conducting glass removed.

With the conducting glasses positioned one above the other as described above, straight, coated metal wires 7, 9, 21–27 extending from one edge of the conducting glass to the other are sandwiched between the conducting layers as is shown in the cutout view of FIG. 1, and in the top view of FIG. 5 wherein the upper conducting glass is removed for clarity. One metal wire is placed on each lower electrode area in parallel with the gaps, and between two adjacent upper and lower gaps, respectively.

The metal wire has an outer diameter within the range of 0.2–0.25 mm, and is coated with a PFA plastic layer of 50 micrometer thickness.

The metal wire consists of seven strands of silver plated ultra high strength copper alloy, each strand having a diameter of 40 micrometer.

Perpendicularly to the metal wires, and near the edges of the conducting glasses, sealing plastic wires 31, 32 are placed. Suitable sealing plastics include the plastics mentioned earlier as suitable for the metal wire coating.

UV curing adhesive strings such as Loctite® 350 (not shown) are placed between the conducting glasses, adjacent to their edges, for fixing the glasses together.

According to the invention, electrical connection between each metal wire and its adjacent conducting layer(s) is created by compressing the assembly 10, using any suitable, conventional press. For example a simple manually operated press with a pressure force gauge could be used, as well as an automated rolling mill for multiple production.

Of course, the optimal process parameters depend on the application at hand, including the selected substrate size, selected materials etc. Therefore, the process parameters given below should be understood as an illustrating example, only.

When the conducting glasses 1, 4 are pressed together with a force F, as is illustrated in FIG. 2, the metal wire coatings are deformed and break immediately above and below each wire into separate parts 8A, 8B and 11A, 11B to expose the metal of the metal wire against the conducting glasses. However, the coating still adheres to the wire between the conducting glasses.

The force F urges the metal wires into contact with the electrode areas, as is illustrated with the electrode areas 3A, 3B, 6A and 6B of FIG. 2. Thereby, electrical connection is established between the upper electrode area 3A and the lower electrode area 6A at contact areas 12, 13 being formed along the wire, and between the upper electrode area 3B and the lower electrode area 6B at contact areas 14, 15, respectively.

At the same time, the parted coating material 8A, 8B and 11A, 11B is deformed in a direction outwardly from the metal wire and is clamped between the conducting glasses 1, 4. Therefore, a coating material should be selected that is ductile enough not to crack in other directions than along the lines of contact 12, 13, 14, 15 between the metal wires 7, 9 and the conducting layers 3, 6.

According to the first example of the first embodiment of the method of the invention, the conducting glasses are sealed and fixed with a procedure including the following steps:
a) applying a force F corresponding to a pressure of 100–500 kg/cm insulated wire between the conducting glasses;
b) relax the pressure (i.e. remove the force F);
c) applying the pressure of a) once more;
d) relax;
e) applying a reduced pressure of 1–2 kg/cm insulated wire;
Preferably, The steps b) and c) are repeated a few times.

It is possible to add a step of pre-compression of the coated wires previous to the steps above, in order to give the coating of the wires a locally flat surface that facilitate the positioning on a plate member.

In some cases it may even be suitable to pre-compress the coated metal wires, such that the coating breaks immediately above and below the metal wire into separate parts and the metal is exposed. Due to this, the force F in the steps of applying a force may be reduced to a force $F_{min}$ which may be considerably lower than F. Hence, electrochemical cells in which one or both of the conducting glasses 1, 4 is fragile or structurally weak may be assembled. Examples of such cells are: thin lightweight cells, cells with conducting glass having a brittle or soft conducting coating, and plastic cells wherein the conductive glass comprise a soft plastic material substrate.

The step of pre-compression according to the last paragraph, may, if desired, be substituted by any other method of providing a side-coated metal wire having an upper and a lower surface being uncoated, and wherein the coating is formed such that the coating on each side of the wire and the plate members forms a closed structure around the conducting wire when the electrochemical cell is assembled. One such method is mechanical stripping of two opposite sides of a conventional coated metal wire using razor blades or the like. Another method is direct manufacturing of a "side-coated" metal wire meeting the above requirements of having the metal wire exposed on two opposite sides and insulating coating that covers the rest of the wire and protect it from the electrolyte when it is arranged in an electrochemical cell.

The importance of thorough cleaning of all areas that shall be connected to achieve a good result should be emphasized. Especially, cleaning the conducting layer of the substrates improves the electrical and mechanical connection to the metal wires, as well as to the insulating coating.

For example, a second example of the first embodiment according to the present invention differs from the first example above in that a 0.1–0,15 mm metal wire being coated with a 100 micrometer Surlyn layer is used. Astonishing enough, it has been shown that if the conducting layers of the conducting glasses are fired to clean the surfaces, the coated wire stick so well to the conducting glasses after compression, that the need for UV curing adhesive strings is reduced or even eliminated.

The good adherence between the coated wires and the conducting glasses in the second example was also enhanced by raising the temperature of the assembly above room temperature during pressing In the first example previously described the pressure was applied at ambient temperature.

Preferably, to determine an appropriate sealing process the electrical resistance between layers/wires that are to be connected is monitored, and application of relaxation/pressure is repeated until a predetermined low resistance measurement is achieved.

Thus, several cell compartments, such as the one indicated at 41 in FIG. 5, are formed between an upper and a lower substrate, each defined by two adjacent essentially parallel coated metal wires, the parallel sealing wires, the upper substrate and the lower substrate. Thus, adjacent cells are chemically and electrically separated by a barrier consisting of a compressed coated wire according to the invention.

To form a complete electrochemical cell, each compartment 41 is filled with an electrolyte (not shown), using any suitable method well known within the art. For example, a hole is drilled in the sealing wires or the conductive glasses, electrolyte is drawn into the compartment and finally the holes are resealed. Actually, with the invention it is also possible to form the electrochemical cell by pre-filling the compartments before sealing the conducting glasses together.

In cases where the electrode areas should be coated by any active substance, such as in the case of photoelectrochemical solar cells, the electrode areas should of course be coated before the sealing of the conducting glasses.

The displaced coating material forms a barrier between the wire and the electrolytic liquid in the cell, as seen in FIG. 2, thereby protecting the metal wire from chemical attack from the electrolyte.

Furthermore, as is seen in FIG. 2 the metal wire is at one side of the compartment electrically connected to the upper electrode area of that compartment as well as to the lower electrode area of the previous compartment of the series connection. At the same time, the other metal wire of the compartment is electrically connected to the lower electrode area of the compartment, as well as to the upper electrode area of the next compartment, thereby providing a series connection.

The metal wires are useful for conducting electric current from or to the electrolytic cells.

Generally, the thickness of each substrate is selected to suit the application at hand. The force to press the electrochemical cell assembly together could be provided using any conventional pressure-generating tool, including a rolling mill whereby the electrochemical cell assemblies are conveyed through the rolling mill. The bonding is preferably made directly during the compression.

It is also possible to add a step of pre-compress previous to the step of compression as described above, in order to make the coating easier to position onto the conducting glass.

The internal distance between the upper and lower substrates is determined by the thickness of the metal wire. The type of coating material, as well as its thickness, determines the pressure force needed and also determines the thickness of the barrier obtained between the metal wire and the cell department created after the pressing.

By forming the wire coating of a thermoplastic that is attachable to the conducting layer, the coating is also useful as a medium for adhering the upper and lower conducting layers together while at the same time providing electrical connection after that the compression force is relieved. This improves the strength of the device. Adding of further adhesive material between the wires will of course improve the mechanical strength of the device.

The metal wire coating can also be provided with an adhesive prior to insertion between the substrates, for example in order to fix the wires in their positions prior to covering them with an upper conducting glass. Different types of adhesives could be used, such as adhesives that adhere to the conducting layer by heating, light irradiation, interaction with the surrounding atmosphere or by evaporation of solvents.

Specifically, by heating the entire assembly including upper and lower substrate with metal wires disposed between the substrates a thermal adhesive is useful. Also, with the use of a thermal adhesive, it is possible to use local heating of the area around the thermal adhesive by transmitting a high current trough the metal wires, thereby heating the wires. Local heating can also be achieved with laser radiation or microwave radiation. In the case of radiation, the coating is preferably made from a good light absorbing material, such as a material including an absorbing dye.

As described with the embodiments above, in addition to the adhering effect established by the coating of the metal wires the upper and lower conducting glasses could be fixed together using any conventional previously known method, such as holding together the outer edges of the conducting glasses with a UV light curing adhesive.

For sealing purposes, an all-plastic thread can be used with the invention in cases where a chemical sealing without electrical connection is desired.

Thus, according to the present invention the upper and lower conducting glasses are electrically connected at the same time as the connecting metal wire is protected from chemicals present in the cell, all in a way that requires very little space.

It should be noted that it is of course not necessary that each metal wire is connected to both a conducting layer of the upper conducting glass and the lower conducting glass, respectively. In fact, one of the conducting glasses of the first embodiment could be replaced by another plate member lacking a conducting layer.

Figure 6:
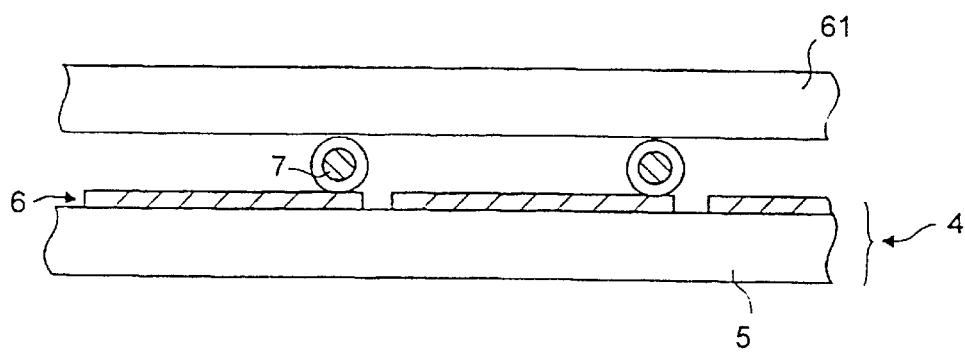
FIG. 6 is a side view of an electrochemical cell according to a third embodiment of the invention, prior to compression.
Figure 7:
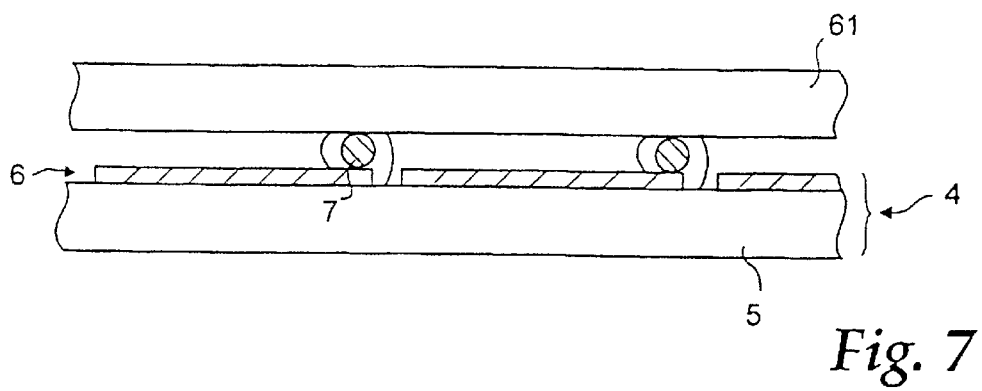
FIG. 7 is a side view of the electrochemical cell of FIG. 6, after compression.

For example, a second embodiment of the invention, as is illustrated in FIGS. 6 and 7, differs from the first embodiment in that the first plate member 61 is a transparent insulating plate having no conducting layer, but covers essentially the entire cell assembly, while the second plate member 4 is similar to the second plate member of the first embodiment. Therefore, after compression each metal wire 7 is electrically connected to the conductive layer 6 only. However, according to the invention cell compartments and protecting barriers are formed similarly to the embodiments previously described. The insulating plate is typically made of glass or a plastic such as PET.

This embodiment is useful, for example, for monolitic cells such as those described by A. Kay and M. Grätzel in Solar Energy Materials and Solar Cells, 44 (1996) 99.

Figure 8:
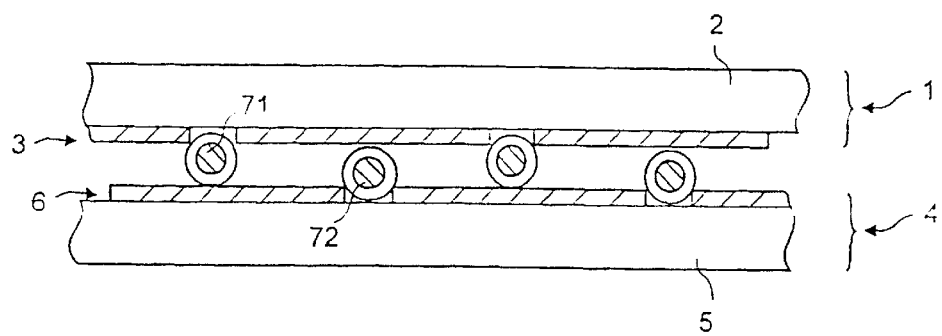
FIG. 8 is a side view of an electrochemical cell according to a fourth embodiment of the invention, prior to compression.
Figure 9:
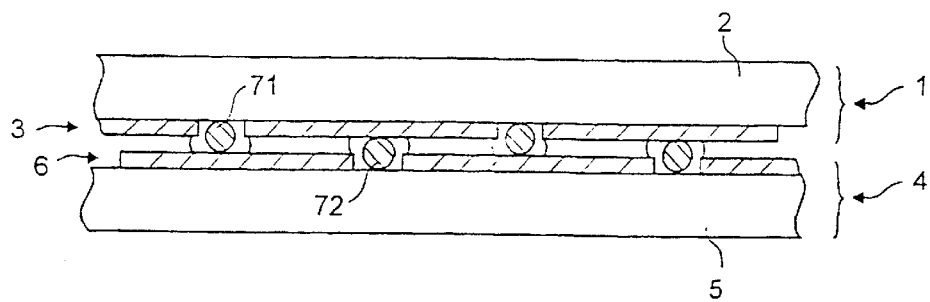
FIG. 9 is a side view of the electrochemical cell of FIG. 8, after compression.

A third embodiment of the invention, as shown in FIGS. 8 and 9, differs from the first embodiment described above in that at least one of the metal wires 71, 72 are so disposed that it, after compression, is electrically connected only to one of the conducting layers, i.e. either to a conducting layer 6 at the lower substrate 5 or to a conducting layer 3 at the upper substrate 2.

This is achieved by disposing such a metal wire 71, 72 under or within, respectively, a gap formed in either conducting layer. The metal wire is preferably coated. This is illustrated in FIG. 8 with a side view before compression and in FIG. 9 with a corresponding side view after compression.

This third embodiment has the advantage that the metal wires are easily registered due to the guiding action of the gaps.

A fourth embodiment of the present invention differs from the first embodiment in that at least one of the conducting glasses 1, 4 has an opaque substrate. Similarly, the transparent insulating plate 61 of the second embodiment above can be formed of an opaque material, such as an opaque glass, plastic or ceramic material.

According to a fifth embodiment of the invention the coated metal wires are pre-compressed, such that the coating breaks immediately above and below the metal wire into separate parts and the metal is exposed, before they are positioned between the plate members. The parted coating material is deformed in a direction outwardly from the metal wire. However, the coating still adheres to the metal wire.

In one experiment the metal wire consisted of seven strands of silver plated ultra high strength copper alloy, each strand having a diameter of 40 micrometer. The outer diameter of the metal wire was within the range of 0.1–0.12 mm.

The coating consisted of a Surlyn 1601 (obtainable from DuPont) plastic layer of 40 micrometer thickness.

The outer diameter of the coated wire was 0.18–0.20 mm.

The coated metal wire was pre-compressed by conveying it through a rolling mill with steel rollers, at a speed of (3 cm wire)/second.

When a coated metal wire is pre-compressed, the coating breaks immediately above and below the metal wire into separate parts and the metal is exposed. The parted coating material is deformed in a direction outwardly from the metal wire. However, the coating still adheres to the metal wire.

The pre-compressed coated metal wire can then be positioned between the plate members in a similar way as described above. However, the pressure needed to establish electrical contact between the metal wires and the adjacent conducting layer(s), is significantly reduced. Therefore, the pre-compressing embodiment is of special importance when using soft or mechanically sensitive materials as conducting plastics.

The pre-compression of the coated metal wires can, of course, be performed by any suitable conventional pressure-generating tool.

Of course it is obvious for anyone skilled in the art to combine the features of the embodiments described above to any new combination to suit the application at hand.

Use of the method according to the invention presents a number of advantages. For example, the method is very "clean", i.e. the material losses are extremely small. The method is also advantageous from environmental point of view in that there is no need for chemicals.

Furthermore, the method is fast and the process equipment calls for comparatively low investment and maintenance costs and requires comparatively small space. All components necessary to form a cell according to the invention are of low cost.

Furthermore, the metal wire that provides the electrical connection between the conductive upper and lower layers also serves as a chemical as well as gas tight sealing between the cells, thereby enhancing the reliable function of the cell.

The manufacturing of electrochemical cells is made at room temperature or any other temperature, as selected to suit the application at hand.

Furthermore, the manufacturing process does not call for vacuum conditions.

What is claimed is:

1. A method for producing an electrochemical cell, the cell including a first plate member and a second plate member for forming walls of the cell, the second plate member including a conducting layer at one side, comprising the steps of:
sandwiching conducting wires coated with an insulating material between the first plate member and the second plate member, the second plate member being oriented in such a way that its conducting layer contacts the coated wires; and
applying a force for pressing the first and second plate members together, the magnitude of said force being selected such that the plate members penetrate through the insulating material of the wires, thereby bringing the conducting wires into electrical connection with the conducting layer of the second plate member.

2. The method according to claim 1, wherein the first plate member includes a conducting layer, and wherein the first plate member during the step of sandwiching is oriented in such a way that its conducting layer contacts the coated wires, thereby allowing electrical contact between the wires and the conducting layer of the first plate member after the step of applying a force.

3. The method according to claim 1, wherein said insulating material is a plastic material.

4. The method according to claim 3, wherein said plastic material is a fluoroplastic material.

5. The method according to claim 4, wherein said fluoroplastic material is selected from the group consisting of fluorinated ethylenepropylene (FEP), perfluoro alkoxy (PFA), ethylene tetrafluroethylene (ETFE), and polytetrafluorethylene (PTFE).

6. The method according to claim 3, wherein said plastic material comprises ionomer resins.

7. The method according to claim 1, further comprising a step of firing at least one of the plate members to improve the adhesion to the coated wires.

8. The method according to claim 1, further comprising a step of pre-compression of the coated wires, in order to provide the coatings with a locally flat surface.

9. A method for producing an electrochemical cell, the cell including a first plate member and a second plate member for forming walls of the cell, the second plate member including a conducting layer at one side, comprising the steps of:
providing side-coated conducting wires having an upper and a lower surface being uncoated, and sides coated with an insulating material;
sandwiching said side-coated conducting wires between the first plate member and the second plate member, the second plate member being oriented in such a way that its conducting layer contacts the side-coated wires; and
applying a force for pressing the first and second plate members together, the magnitude of said force being selected such that the conducting wires are set into electrical connection with the conducting layer of the second plate member, and the coating of each side-coated wire and the plate members forms a closed structure around each conducting wire.

10. The method according to claim 9, wherein the step of providing side-coated conducting wires, comprises pre-compressing conventional coated conducting wires, to such an extent that the coating breaks, and an upper and a lower surface of the conducting wires become uncoated.

11. The method according to claim 9, wherein the step of providing side-coated conducting wires, comprises mechanical stripping of two opposite sides of conventional coated conducting wires.

12. The method according to claim 9, wherein the step of providing side-coated conducting wires, comprises manufacturing of side-coated conducting wires.

13. The method according to claim 9, wherein the first plate member includes a conducting layer, and wherein the first plate member during the step of sandwiching is oriented in such a way that its conducting layer contacts the side-coated wires, thereby allowing electrical contact between the wires and the conducting layer of the first plate member after the step of applying a force.

14. The method according to claim 9, wherein said insulating material is a plastic material.

15. The method according to claim 14, wherein said plastic material is a fluoroplastic material.

16. The method according to claim 15, wherein said fluoroplastic material is selected from the group consisting of fluorinated ethylenepropylene (FEP), perfluoro alkoxy (PFA), ethylene tetrafluroethylene (ETFE), and polytetrafluorethylene (PTFE).

17. The method according to claim 14, wherein said plastic material comprises ionomer resins.

18. The method according to claim 9, further comprising a step of firing at least one of the plate members to improve the adhesion to the coated wires.

19. An electrochemical cell, including a first plate member, a second plate member, the first plate member being positioned above the second plate member to define a cell compartment therebetween, and at least one of the plate members having a conducting layer at a side facing the other plate member, wherein a metal wire is disposed between and in contact with the plate members for direct electrical contact with at least one of the conductive layers, said metal wire being provided with an insulating material squeezed between, and contacting, the plate members.

20. The electrochemical cell according to claim 19, wherein said insulating material is a plastic material.

21. The electrochemical cell according to claim 20, wherein said plastic material is a fluoroplastic material.

22. The electrochemical cell according to claim 21, wherein said fluoroplastic material is selected from the group consisting of fluorinated ethylenepropylene (FEP), perfluoro alkoxy (PFA), ethylene tetrafluroethylene (ETFE), and pllytetrafluorethylene (PTFE).

23. The electrochemical cell according to claim 20, wherein said plastic material comprises ionomer resins.

* * * * *